March 13, 1951 S. L. BERGEY ET AL 2,544,648
ANTENNA APPARATUS

Filed March 22, 1946 3 Sheets-Sheet 1

INVENTORS
STANLEY L. BERGEY
JAMES A. NOTTINGHAM
BY
ATTORNEY

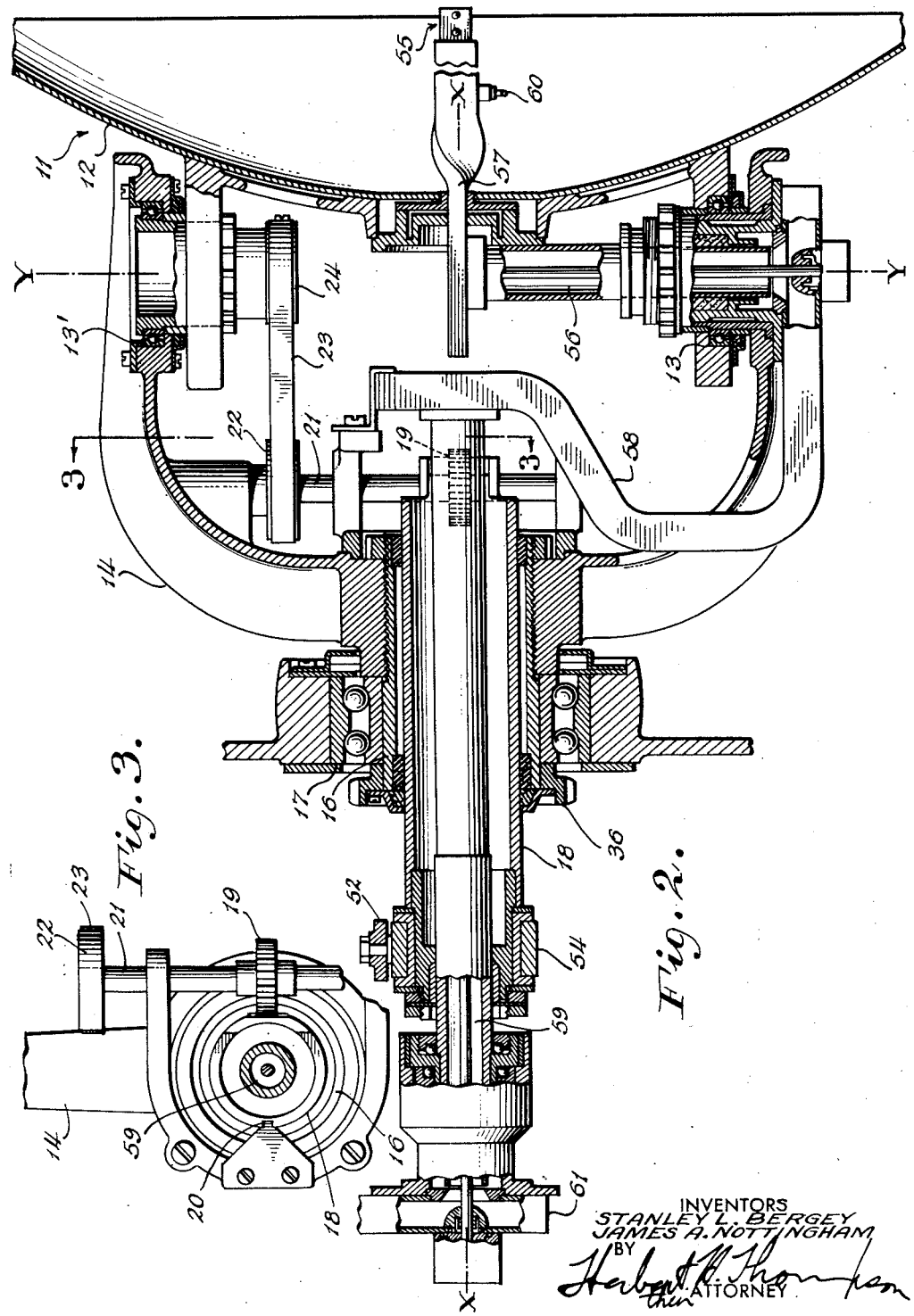

UNITED STATES PATENT OFFICE 2,544,648

ANTENNA APPARATUS

Stanley L. Bergey, Hempstead, and James A. Nottingham, Garden City, N. Y., assignors to The Sperry Corporation, a corporation of Delaware Application March 22, 1946, Serial No. 656,226

7 Claims. (Cl. 250—33.65)

The present invention relates to directive antenna scanning systems and more particularly to scanning systems suitable for regular scanning through any of several scanning patterns.

Directive antenna scanning systems have been employed in various types of radio navigation systems, and in radar systems employed for determination of remote object directions and distances. Usually, the directive antenna system is provided with a motor-driving unit adapted to cause the directive axis of the antenna to be moved through a predetermined range of movement at a regular rate, the type and range of movement being fixed according to the type of service for which the system is intended.

Radar systems have been provided in diverse forms for different tactical purposes. One example is a radar system for enabling one aircraft to intercept another aircraft and to direct its fire toward the intercepted craft. Another example is a radar system arranged to enable one craft such as an airplane, for example, to search for a vessel upon the ocean and to direct explosive charges toward the vessel. A radar system for the former purpose employs variable angle conical scanning, referred to as "spiral" scanning, wherein the directive antenna is rotated about the longitudinal axis of the craft at a first speed, and the angle between the antenna axis and a direction substantially parallel with the longitudinal axis of the craft is regularly varied between zero and a predetermined maximum angular divergence. By observing the variations of the strength of reflected signals in relation to the variation of the antenna direction, the pilot of the interceptor aircraft may operate the craft in such a way as to aim the longitudinal axis of the craft toward the intercepted airplane, and thus to direct fixedly mounted and forwardly aimed guns in the interceptor craft toward the intercepted airplane. A scanning system of this general type is described in detail and claimed in U. S. Patent 2,407,305 to Langstroth et al., issued September 10, 1946, and assigned to the assignee of the present invention.

The type of radar system which has been provided for enabling a craft operator to find a vessel on the surface of the ocean and to direct explosive charges theretoward, on the other hand, is arranged for regular oscillatory scanning of the antenna directive axis through a substantially horizontal and substantially planar range of movement.

In view of the different individual types of directive antenna scanning systems heretofore available, if a single aircraft were required to be equipped both for enemy aircraft interception and for finding and attacking sea-borne craft, it would be necessary to provide the aircraft with two complete radar systems, or at the least, with two complete directive antenna scanning systems for use in conjunction with interchangeable transmitter and receiver units, since neither of the above types of radar antenna scanning systems is well suited to serve the purposes of the other. However, it is essential to the most effective employment of aircraft that the size and weight of the radio equipment carried thereby be kept to a minimum, in order that the aircraft be enabled to carry sufficient armament, ammunition, and fuel for maximum effectiveness over a large radius of operation.

An object of the present invention is to provide an improved directive antenna scanning system of great flexibility of application.

More specifically, it is an object of the present invention to provide without sacrifice of ruggedness and simplicity and reliability a directive antenna scanning system suited for a variety of regular scanning patterns selectable at the will of the operator.

Another object of the present invention is to provide a directive antenna scanning system suited for a variety of regular scanning patterns selectable at the will of the operator, and to arrange the directive antenna scanning system for maintenance of optimum scanning speed consistent with the pattern and mode of operation.

It is a further object to provide an improved directive antenna scanning system wherein the antenna directive axis may be oscillated about a transverse axis, which axis of oscillation either may be regularly rotated about a further axis concurrently with the oscillation, or may be fixed in a predetermined orientation for substantially planar scanning of the directive axis.

Yet another object is to provide a directive antenna scanning system wherein the antenna directive axis may be regularly oscillated through a variable angular extent at the maximum speed of oscillation consistent with reliable performance of the system.

These objectives have been met in the present invention by the provision of a directive antenna pivotally mounted for oscillation about an axis transverse the directive axis of the antenna, through a range of oscillation with which is co-ordinated the oscillatory period, the speed of oscillation and range thereof being made simultaneously variable under the control of the operator. Mechanism is provided for rapidly rotating the antenna and the pivotal mounting therefor about an axis of rotation transverse the axis of oscillation, or for selectively arresting the rotation and fixing the axis of oscillation in a predetermined orientation, e. g., in a substantially vertical orientation so that the antenna directive axis is swept through a substantially planar and substantially horizontal range of directions. The oscillation of the antenna is effected through reciprocal relative translation of a tubular sleeve and a member extending therethrough, and the rotation of the antenna is accomplished by rotation of the tubular sleeve in a bearing aligned with the longitudinal axis of the craft. The angular extent and the period of the oscillation are coordinately controlled by varying the ratio of lever arms in a reciprocating linkage employed to produce the reciprocal translation between the tubular sleeve and the member extending therethrough, and by simultaneously shifting the setting of a variable speed coupling through which the linkage is driven by a motor. The member extending through the tubular sleeve is itself made hollow, to permit the efficient transfer of high-frequency radio energy therethrough.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above objects and features of the present invention will be better understood, and further objects will become apparent, from the following description of a preferred embodiment of the present invention, illustrated in the drawings, wherein:

Figs. 2 and 3 are longitudinal and cross-sectional views, respectively, showing constructional details of the main scanner assembly of the embodiment illustrated in Fig. 1.

Like reference characters are used throughout the drawings to designate similar portions thereof.

Figure 1:
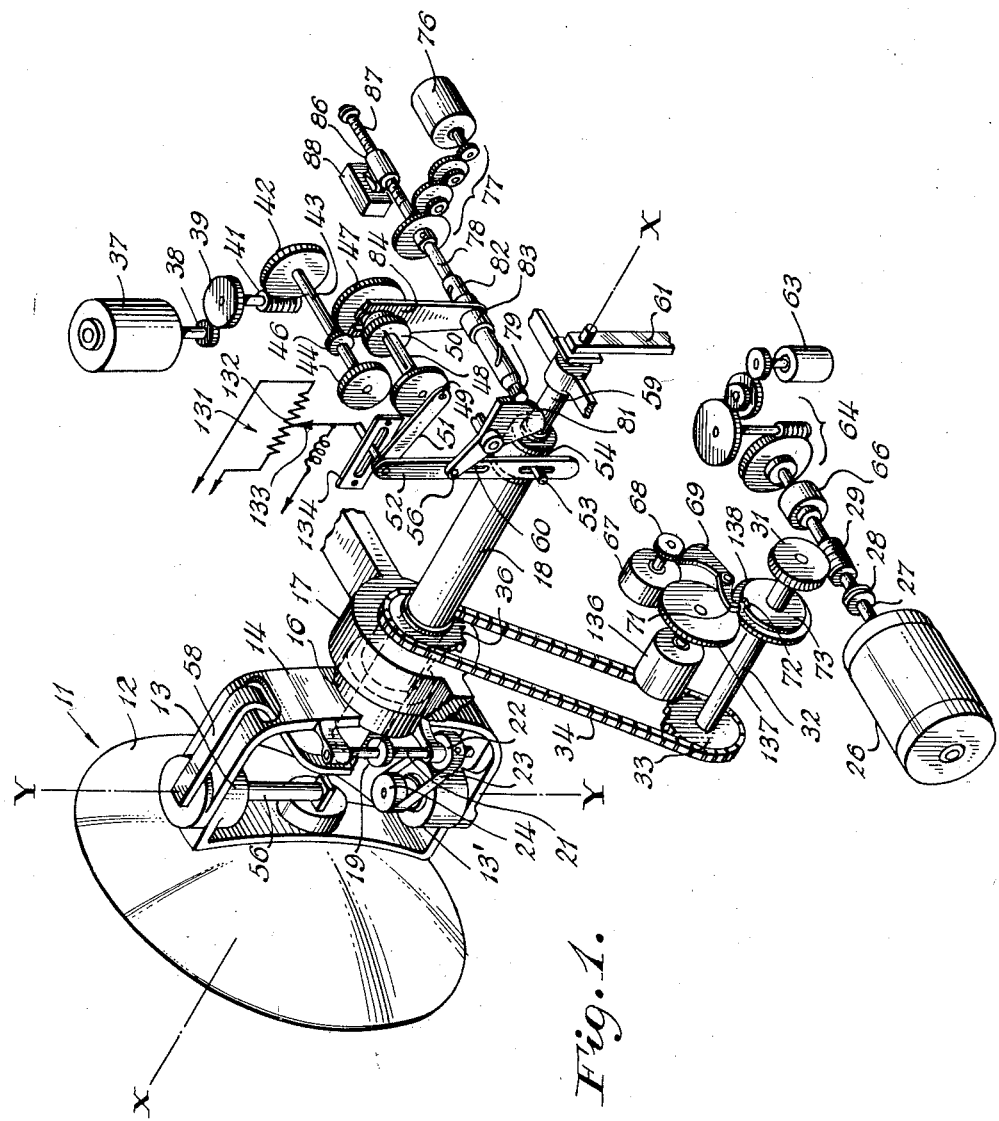
Fig. 1 is a schematic representation of the mechanical elements of an embodiment of the present invention.

In Figs. 1 and 2 there is shown a directive antenna 11 illustrated as comprising a paraboloidal reflector 12. The antenna 11 is pivotally supported in bearings 13, 13′ for oscillation therein about an axis Y—Y transverse the axis of the paraboloid 12, which latter coincides substantially with the axis of directivity of antenna 11. Bearings 13 and 13′ are supported within a yoke 14 rigidly connected to an outer sleeve 16, which in turn is supported within a bearing 17 for rotation about axis X—X, the axis of sleeve 16.

An inner member 18, which may itself be tubular in form, is slideably arranged within the outer tubular sleeve or member 16 for rotation therewith but for relative translation with respect thereto along the axis X—X. In order to prevent relative rotation between the outer sleeve 16 and the inner member 18, a key 20 (Fig. 3) rigidly connected to the yoke 14 is arranged to cooperate with an elongated slot or groove along the outer surface of inner member 18 parallel with the axis thereof. A rack formed in the end of the inner member 18 extending within yoke 14 is arranged to mesh with a spur gear 19 (Figs. 1, 2 and 3) which in turn is coupled through a shaft 21, a pulley 22 and a belt 23 to a pulley 24 rigidly fastened to antenna 11 and coaxial with the Y—Y axis bearings 13 and 13′. Through this chain of elements, reciprocal translation of the inner member 18 is enabled to produce and accurately control oscillatory movement of the antenna 11 about the axis Y—Y. If preferred, a pair of meshed sector spur gears of equal pitch diameters, one on shaft 21 and the other on antenna 11, may be used instead of pulleys 22 and 24 and belt 23.

A motor 26 (Fig. 1) coupled through a shaft 27, a flexible coupler 28, a worm 29 and worm gear 31, a shaft 32, and a sprocket 33 and chain 34 is arranged to produce regular rotation of a sprocket 36 fixed to the tubular outer sleeve 16. This motor is arranged for high-speed regular rotation of yoke 14 and the antenna 11 supported therein, e. g., at a speed of 1,200 revolutions per minute.

Another motor 37 is coupled through speed reduction gears 38, 39, 41 and 42 to a shaft 43 upon which are carried a large spur gear 44 and a small spur gear 46. The small-diameter gear 46 is shown meshed with a large gear 47 arranged integrally with a smaller gear 50. The unit including gears 47 and 50 is internally splined and slidably arranged on a splined shaft 48 for driving a crank pin 49. This pin 49 is coupled through a connecting rod 51 to one end of a lever arm 52. The lever arm 52 is coupled, by a pin 53 coacting in a slot thereof, to a collar 54 seated in a circumferential groove in the end of the inner member 18. The lever arm 52 is arranged to pivot about a fulcrum 56, so that rotation of the crank pin 49 causes reciprocal translatory movement of the upper end of the lever arm 52, and accordingly compels the collar 54 to impart reciprocal translation to the inner member 18 along the X—X axis.

The connecting pin between connecting rod 51 and the upper end of lever arm 52 is arranged to be guided in a longitudinal slot or groove parallel to the common axis of the outer sleeve 16 and the inner member 18 in a stationary guide member 134. A potentiometer 131 having a fixedly positioned stator 132 has a slider arm 133 fixed to the connecting pin which pivotally joins connecting rod 51 and the upper end of lever 52. This potentiometer may be electrically connected with a voltage source and arranged for supplying an output voltage varying precisely in accordance with the variation of the nod angle of antenna 12. Such a voltage is useful in cooperation with radar indicator apparatus or direction finder indicator apparatus, such as may be employed with the antenna 11.

A further directional reference voltage for an indicator may be provided by a generator 136 coupled through spur gears 137 and 138 to the shaft 32 and hence positively coupled to the outer tubular sleeve 16 for rotation therewith. The voltage variations determined by generator 136 and the potentiometer 131 may be applied in a well known manner to directional indicator arrangements, as for example, to the deflection circuits of a cathode ray object position indicator coupled to the output circuit of a radar receiver.

The use of generators and potentiometers coupled to a regularly moving directive antenna for producing synchronous sweep in an indicator is illustrated in British Patents 497,147, December 9, 1938, British Thomson-Houston Company, and 542,634, January 21, 1942, F. Rost et al.

An ultra high frequency energy transfer system extends through the member 18 for enabling energy to be transferred between the antenna 11 and a transmitter or a receiver, or a combination of a transmitter and receiver arranged for alternate employment of the antenna. This energy transfer system may include a wave guide 57 (Fig. 2) extending along the axis of the paraboloidal reflector 12 substantially to the focal point thereof. The rearmost part of wave guide 57 may be arranged for vertical polarization when the axis Y—Y is vertical; and the wave guide may be twisted through 90° between the rearmost point of reflector 12 and the focal region thereof, to provide for horizontal polarization in the focal region when axis Y—Y is vertical. If desired, a dipole unit 55 including one or more dipole elements extending through and supported by a vertical plate may be attached to the end of wave guide 57 at the focal region of reflector 12, the dipole elements being coupled to the wave guide 57 and being positioned substantially at the focus of the reflector 12.

Moreover, if desired, a further dipole element 60 may be attached to wave guide 57 in an elastic retaining mount arranged to hold it oriented parallel to the dipole elements of unit 55 during mere oscillation of antenna 11, but to be turned through 90° by centrifugal force, into a position of minimum interaction with the dipole elements of unit 55, when the antenna 11 is rapidly rotated. Such an arrangement of a wave guide, dipole unit and shiftable further dipole element is shown and discussed at greater length and claimed in copending U. S. application Serial No. 585,825 of John E. Karlson, filed March 31, 1945.

A coaxial line 56 having its inner conductor extending through wave guide 57 and its outer conductor ending in a junction with the wall thereof may be employed as a link to a further wave guide 58, joining wave guide 56 in a rotatable junction adjacent bearing 13. This junction is generally similar to the junction between coaxial transmission line 56 and wave guide 57, except that the inner and outer conductors of transmission line 56 are arranged to be rotated about their common axis (which is coincident with the Y—Y axis) relative to wave guide 58. Wave guide 58 is coupled at its opposite end to a hollow high frequency energy conductor 59 which may be a coaxial transmission line or a wave guide extending along the axis X—X of rotation of the antenna system. The hollow high frequency energy conductor 59 may be directly connected to wave guide 58, and hence may be mechanically fixed to the yoke 14. This conductor is then rotated along with the tubular outer sleeve 16 by the operation of the spinner motor 26. At its rearmost end, the hollow high frequency energy conductor 59 may be coupled by a further rotating joint to a stationary wave guide 61, through which energy is transferred to or from the associated radio circuits.

In accordance with one important feature of the present invention the operator is permitted to stop the high-speed rotation of the antenna about axis X—X by the spinner motor 26, and to lock the tubular outer sleeve 16 and the yoke 14 in a position for alignment of the Y—Y axis of the oscillation-permitting bearings 13 and 13' in a predetermined orientation, e. g., in a substantially vertical orientation. The oscillation of the antenna 11 produced by the operation of motor 37 is continued, so that the directive axis of the antenna 11 is made to sweep through a substantially horizontal and substantially planar zone. In order to facilitate the automatic locking of the rotatable system 11, 14, 16, 18, 32 with axis Y—Y in a predetermined alignment, a miniature motor 63 is coupled through a high-ratio speed-reduction gear train 64 and an overdrive clutch 66 to the worm 29. Electrical circuits illustrated in Fig. 4 and hereinafter described in further detail are provided for simultaneously de-energizing motor 26 and energizing the indexing motor 63 to provide extremely slow rotation of the antenna 11 about axis X—X.

A spring-opposed torque motor electric switch unit 67 or rotary relay is energized after a predetermined time interval following the de-energization of motor 26, and the relay 67 then exerts a torque tending to cause its rotor to be rotated through a predetermined angle, e. g. 30°, for actuation of its switch contact elements. The rotary relay unit 67 is coupled through a spur gear 68 and a sector gear 69 to a tooth 71 arranged to engage in a slot 72 in a cam 73 fixed on shaft 32. When the rotary relay 67 is energized, it depresses the tooth 71 against the cylindrical outer face of cam 73, until the axis Y—Y of bearings 13 and 13' arrives at a predetermined alignment, which preferably is an alignment parallel to the normally vertical axis of the craft in which the system is installed. When this alignment is reached, as indicated by the arrival of slot 72 directly beneath tooth 71, the rotary relay torque depresses the tooth 71 into the slot 72. Sufficient rotation of the relay rotor element is thereby permitted by the depression of tooth 71 to shift the rotary relay contactors and to de-energize the index motor 63 to which the rotary relay is electrically connected. The rotary relay unit 67 thereafter continues to apply sufficient torque to the sector gear 69 to hold the tooth 71 in engagement with slot 72, so that this tooth retains the antenna system accurately indexed and positively locked against rotation about the X—X axis.

When it is desired to return to the spiral scanning mode effected by simultaneous rotation of outer sleeve 16 and translation of the inner member 18, the rotary relay 67 is de-energized, so that the tooth 71 is immediately withdrawn from its locking position in the slot 72; and the spinner motor is energized, so that the rapid rotation of the antenna about the X—X axis is again provided.

In order to obtain still further flexibility of modes of operation of the scanning system, apparatus is provided for effecting simultaneous and correlated shifts in the angular range of oscillation of antenna 11 about axis Y—Y and in the period of the oscillation. When the angular range of oscillation is increased, the period of the oscillation is increased substantially proportionately; and when the angular range is decreased the period of oscillation is decreased substantially proportionately. In this way, the antenna may be oscillated at all times at the optimum speed consistent with the angular coverage provided thereby.

For this purpose, an angular range shifting motor 76 is coupled through a speed reduction gear train 77 to a shaft 78 upon which is provided a spur gear 79 meshing with a sector gear 81, Sector gear 81 controls the position of the fulcrum pin 56 about which the lever arm 52 operates. A helical cam 82 is also provided upon the shaft 78 for driving a cam follower 83 in translation parallel to the shaft 78 and also parallel to shaft 43 through which power is transmitted to the crank 49 to impart oscillation to the antenna 11. A fork 84 rigidly connected to cam follower 83 is arranged to shift the unitary pair of spur gears 47, 50 along the splined shaft 48.

When shaft 78 is in the position in which it is shown in Fig. 1, the fulcrum pin 56 is at the top of its travel, so that the ratio of the lever arms above and below the fulcrum pin is set for maximum travel of the inner member 18 and, accordingly, for maximum angular range of oscillation of the antenna 11. This maximum range of oscillation may be of the order of 130°. At the same time, the larger spur gear 47 of the gear pair 47, 50 meshes with the smaller gear 46 of the driving gears 44, 46, providing for long-period oscillation—e. g., for one oscillation cycle per 4 seconds. Upon clockwise rotation of the shaft 78 as viewed in Fig. 1, however, as produced by counter-clockwise operation of the shift motor 76, the fulcrum pin 56 is caused to move from the top to the bottom of the slot 60 in the lever arm 52, and accordingly, to reduce the range of travel of the member 18. As a result, the range of oscillation of antenna 11 is proportionately decreased, e. g., to an angular range of the order of 30°. At the same time, the fork 84 is moved toward the spur gear 79, taking the large-diameter gear 47 out of engagement with driving gear 46 and bringing gear 50 into engagement with driving gear 44, to provide a predeterminedly increased rate of rotation of shaft 48, and thus a shorter period of oscillation of antenna 11.

The diametral ratios of spur gears 46 and 47, and of the alternatively coupled gears 44 and 50, may be selected for changing the period of oscillation of the antenna 11 about the Y—Y axis substantially in proportion to the change of the angular range of oscillation. For example, the period of oscillation may be reduced from four seconds to one second when the angular range of oscillation is reduced from 130° to 30°.

A further cam follower 86 may be provided upon a further helical cam portion 87 of shaft 78 for operating a switch 88 which may be arranged as a limit stop and travel reversing switch. Switch 88 may be arranged to arrest motor 76 upon the completion of a nod angle shifting operation, and to preset suitable control circuits for subsequent operation of the motor 76 in the reverse direction to change the oscillation conditions in the opposite sense.

Figure 4:
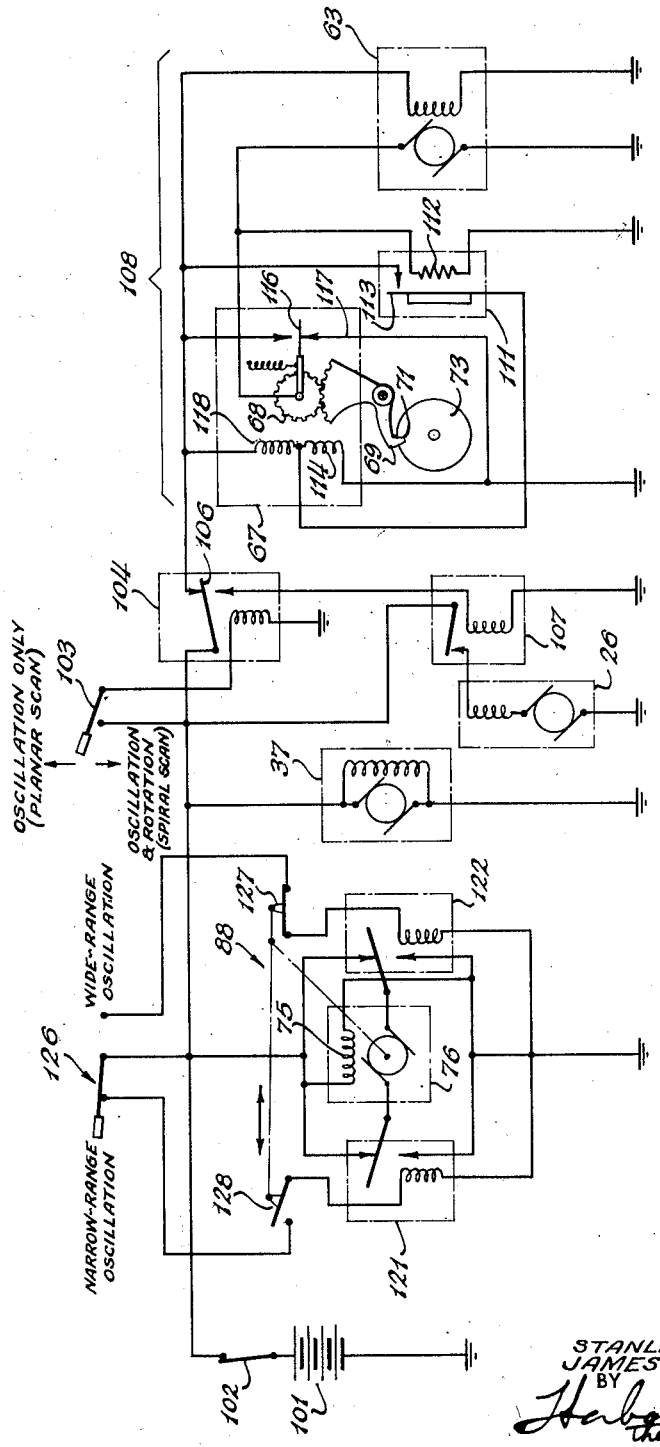
Fig. 4 is an electrical schematic diagram showing the control circuits associated with the elements in Fig. 1.

The electric circuit arrangements for this feature, as well as for the choice between spiral scan and oscillatory scan about a fixed axis, are shown in Fig. 4. An electric source 101, which may be an aircraft ignition supply battery, is grounded at one terminal to the craft framework and connected at its opposite terminal to a main scanner power switch 102. Through switch 102, power from source 101 is supplied to the nod motor 37, to circuits for determining the angular range and period of oscillation, and to further circuits arranged for either energizing the spin motor 26 to produce spiral scanning or de-energizing motor 26 and locking the antenna about the X—X axis for oscillation only about a substantially vertical Y—Y axis.

Switch 102 is connected at its output terminal directly to one terminal of motor 37, whose opposite terminal is grounded. Motor 37 with this connection is operated at all times when the main control switch is closed.

The output terminal of switch 102 is also connected to a scanning mode selector switch 103 connected in series with the coil of a scanning mode selector relay 104. When switch 103 is closed, the contact arm 106 of relay 104 completes an actuating circuit through a heavy duty relay 107, through which the antenna rotating motor 26 is then energized to provide rapid rotation of the antenna system about the X—X axis. While switch 103 is closed and relay 104 is energized, the contact arm 106 isolates the indexing circuits 108 from source 101, so that these circuits are prevented from interfering with the rapid rotation of the antenna system. When switch 103 is opened, the heavy duty relay 107 is de-energized, and accordingly, the spin motor 26 is turned off. The return of the contact arm 106 of relay 104 to its raised position energizes time delay relay 111 and the indexing motor 63. The indexing motor maintains the antenna 11 in rotation at an extremely low speed about the X—X axis, e. g., at a speed of one revolution per minute.

After a predetermined time interval for which the time delay relay 111 is preadjusted, the contacts of the time delay relay are closed, as by the action of heat produced by a resistance element 112 and gradually transferred to a bi-metallic contact arm 113, and the closing of this contact circuit applies the full voltage of source 101 to the main operating coil 114 of the rotary relay 67. This causes an appreciable torque to act upon the relay rotor 68, tending to cause rotation of the rotor and to carry the movable contact element 116 of the rotary relay 67 from its quiescent raised position, wherein it is connected through relay 104 and switch 102 to the high-potential terminal of source 101, downward to a position in which this movable element contacts a grounded contact terminal 117. The rotary relay torque motor is prevented from turning, however, until cam 73 rotates to the position at which it permits engagement of the cooperating elements 71 and 73 whereupon the relay rotor turns clockwise sufficiently to connect its movable contact element 116 to terminal 117, which is connected to ground. This de-energizes and short-circuits the rotor of indexing motor 63, and reduces the actuating current through the main torque coil 114 of the rotary relay 67, by the opening of the contact elements of the time delay relay 111 and the consequent connection of a high resistance holding coil 118 in series with coil 114 in the source voltage circuit. Holding coil 118 thereafter maintains the rotary relay rotor in its actuated position, until a further operation of relay 104 is executed for restoration of spiral scanning.

For changing back from suubstantially planar scanning to spiral scanning, the switch 103 is closed, de-energizing the entire indexing circuit 108 and releasing the element 69, 71 from engagement with the cam 73, and energizing spin motor 26 to provide full speed rotation about the X—X axis.

Regardless of the type of scanning employed (i. e., whether the Y—Y axis is stationary or is rapidly rotated about the X—X axis), the operator of the scanning system is able by a simple switch operation to vary the angle through which the antenna is oscillated about the Y—Y axis. For this purpose, the shift motor 76 is arranged with its field coil 75 continuously energized in a fixed polarization during operation of the scanning system, and its rotor circuit is connected between the movable contact arms of a pair of relays 121 and 122. Normally, both of these relays are de-energized, so that no potential difference is applied to the shift motor rotor circuit. For example, with the circuit conditions illustrated in Fig. 4, the coil circuit of relay 121 is held open by switch element 128 and the coil circuit of relay 122 is held open by switch 126. In order to change the angular range of oscillation of the antenna 11, e. g., from narrow range to wide range, the operator need only throw the blade of the single pole, double throw switch 126 to the opposite position, e. g., to the right. This completes the circuit through the closed one 127 of the ganged switch elements of the cam-operated switch 88, energizing relay 122, and producing a resultant potential difference between the rotor terminals of motor 76. This motor then operates through a predetermined range of movement, sufficient to effect the shifting of gears 47 and 50 (Fig. 1) and of the reciprocating linkage fulcrum 56, whereupon switch element 127 of switch 88 is opened and the opposite switch element 128 thereof is simultaneously closed. The opening of switch element 127 de-energizes the relay 122 which was energized upon the throwing of switch 126, and the closing of switch 128 presets the circuit through relay 121 for actuation by a further operation of switch 126.

Thus, the oscillation range shift motor 76 is arranged to be energized only for a relatively brief period, sufficient to effect a shift of angular range and period of oscillation of the antenna, and to provide cam operation of the switch 88 arranged to limit the extent of movement of the shift system and to preset suitable circuits for a subsequent oscillation range shift in the opposite sense.

With the circuits shown in Fig. 4 in conjunction with the mechanical features of the present invention illustrated in Figs. 1–3, an operator is enabled to select any of four scanning conditions, as follows:

(1) Spiral scanning (switch 103 closed), with wide-range oscillation (the arm of switch 126 thrown to the right);

(2) Spiral scanning (switch 103 closed), with narrow-range oscillation (switch 126 thrown to the left);

(3) Substantially planar, wide-range oscillation (switch 103 open and switch 126 thrown to the right); and (4) Substantially planar, narrow-range oscillation (switch 103 open and switch 126 thrown to the left).

With any of the above four scanning conditions, the antenna is positively driven at the maximum speed consistent with long life and dependability of the mechanical elements. All motive power required for regularly varying the antenna aiming is transmitted through strong mechanical elements from fixedly mounted motors, so that no control circuits need be carried through moving parts of the scanner apparatus. Real flexibility of application is made available with substantially instantaneous changeability from any of the above four operating conditions to any other. The electrical efficiency of the system is very high, since the antenna rotation motor is energized only when spiral scanning is employed, and the oscillation producing motor is fully active in all modes of operation. The oscillation range and period shift motor and the indexing motor are very small, and neither of these motors is employed except during a change of the scanning conditions.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Periodically moving directive antenna apparatus for operation in wide-range or narrow-range horizontal oscillatory scan or in wide-angle or narrow-angle spiral scan, comprising a directive antenna having an axis of directivity, a tubular sleeve, first bearing means carried by said tubular sleeve and supporting said directive antenna for rotation about an axis transverse the axis of said sleeve, further bearing means supporting said tubular sleeve for rotation about its axis, an inner member in said tubular sleeve translatable with respect thereto, means coupling said inner member to said directive antenna for rotating said antenna about said transverse axis in synchronism with translation of said inner member, motive means for imparting reciprocal translation to said inner member to produce oscillation of said antenna about said transverse axis, means for shifting the period of translation from a first period to a second period and shifting the range of travel of said inner member from a first range to a second range different from said first range by a ratio substantially proportional to the ratio of said second period to said first period, and means selectively operable to rotate said sleeve and said first bearing means rapidly about the axis of said sleeve for spiral scan and to bring said sleeve into position for substantially vertical-plane orientation of said transverse axis for substantially horizontal scan.

2. Apparatus as defined in claim 1, further including means for transferring radio energy through said inner member between said antenna and a fixed point.

3. Apparatus as defined in claim 1, wherein said inner member is tubular; said apparatus further including hollow conductor means for transferring radio energy through said inner member between said antenna and a fixed point.

4. Apparatus as defined in claim 1, wherein said inner member is tubular; said apparatus further including hollow conductor means for transferring radio energy through said inner member between fixed radio apparatus and said antenna, said hollow conductor means comprising a coaxial transmission line section extending through said tubular inner member, and means coupling said coaxial line to said antenna.

5. Dual-purpose periodically moving directive antenna apparatus permitting alternative operation in planar oscillatory scan and spiral search throughout a zone bounded by a conical locus, comprising a directive antenna having an axis of directivity, a tubular outer sleeve supported for rotation about its axis, an inner member borne within said outer sleeve for movement with respect thereto, bearing means fixed to said outer sleeve for supporting said directive antenna and permitting rotation thereof about an axis transverse said outer sleeve axis and said axis of directivity, means coupling said inner member to said antenna for rotating said antenna about said transverse axis according to relative movement between said outer sleeve and said inner member, means for imparting regular movement to said inner member relative to said outer sleeve for regularly varying the angular displacement between said axis of directivity and said outer sleeve axis, means for imparting regular rotation to said outer sleeve and said transverse axis bearing means about said outer sleeve axis, normally ineffective means for arresting said outer sleeve with the transverse axis of the antenna in a predetermined position, normally ineffective means for reducing the speed of rotation of said outer sleeve and said transverse axis bearing means, and means operable to disable said regular rotation imparting means for said outer sleeve and render said arresting and speed reducing means effective.

6. Dual-purpose periodically moving directive antenna apparatus for permitting alternative operation in planar oscillatory scan and in spiral search throughout a zone bounded by a conical locus, comprising a directive antenna having an axis of directivity, a tubular outer sleeve member supported for rotation about its axis, an inner member borne within said outer sleeve member for movement with respect thereto, bearing means supported by one of said members for supporting said directive antenna for rotation about an axis transverse said outer sleeve member axis and said axis of directivity, means coupling the other of said members to said antenna for rotating said antenna about said transverse axis according to relative movement between said outer sleeve member and said inner member, means for producing regular relative movements between said outer sleeve member and said inner member independently of the rotation of said bearing means supporting member for regularly varying the angular displacement between said axis of directivity and said outer sleeve member axis, means for imparting regular rotation at a first speed to the one of said members which supports said transverse axis bearing means, normally ineffective means for arresting said transverse axis bearing means with the transverse axis of the antenna in a substantially vertical position, normally ineffective means for reducing the speed of rotation of said transverse axis bearing means, means operable to disable said regular rotation imparting means for said transverse axis bearing means and render said arresting and speed reducing means effective, and means operable by said arresting means for disabling said speed reducing means when the transverse axis of the antenna is arrested in a substantially vertical position.

7. Dual-purpose periodically moving directive antenna apparatus for permitting alternative operation in planar oscillatory scan and in spiral scan throughout a zone bounded by a conical locus, comprising a directive antenna having an axis of directivity, a tubular outer sleeve member supported for rotation about its axis, an inner member borne within said outer sleeve member for movement with respect thereto, bearing means supported by one of said members for supporting said directive antenna for rotation about an axis transverse both said outer sleeve member axis and said axis of directivity, means coupling the other of said members to said antenna for rotating said antenna about said transverse axis according to relative movement between said members, means for producing regular relative movement between said members for periodically varying the angular displacement between said axis of directivity and said outer sleeve member axis, means for imparting high-speed regular rotation to the one of said members which supports said transverse axis bearing means, whereby said directive axis is swept through a spiral scanning pattern, means for selectively reducing the speed of rotation of said one member to a very gradual rotation and applying sufficient torque thereto to sustain said gradual rotation to enable said bearing means supporting member to be arrested upon the attainment of predetermined orientation of said transverse bearing means, a movable locking device adapted to be coupled to said bearing means supporting member for holding it locked in a position with said transverse axis bearing means in said predetermined orientation, means operative during gradual rotation of said bearing means supporting member for urging said locking device into coupled relation with said bearing means supporting member, and means responsive to the movement of said locking device into coupled relation with said bearing means supporting member for terminating the application of torque to said member upon the locking thereof with said transverse axis in said predetermined orientation, whereby the operation of the apparatus automatically may be converted from spiral scanning to mere oscillatory scanning about a predetermined axis.

STANLEY L. BERGEY.
JAMES A. NOTTINGHAM.

REFERENCES CITED

The following references are of record in the file of this patent:

UNITED STATES PATENTS

| Number | Name | Date |
|---|---|---|
| 1,032,479 | Havenor | July 16, 1910 |
| 2,407,305 | Langstroth et al. | Sept. 10, 1946 |
| 2,407,310 | Lundy et al. | Sept. 10, 1946 |
| 2,410,666 | Leck | Nov. 5, 1946 |
| 2,410,827 | Langstroth et al. | Nov. 12, 1946 |
| 2,412,867 | Briggs et al. | Dec. 17, 1946 |
| 2,437,275 | Skene et al. | Mar. 9, 1948 |